UNITED STATES PATENT OFFICE.

BYRON W. NICHOLS, OF COXSACKIE, NEW YORK.

IMPROVEMENT IN WELDING STEEL.

Specification forming part of Letters Patent No. 117,199, dated July 18, 1871.

*To all whom it may concern:*

Be it known that I, BYRON W. NICHOLS, of Coxsackie, in the county of Greene and State of New York, have invented a new Process of Decarbonizing the Surfaces of Steel to Facilitate Welding; and I do hereby declare that the following is a full, clear, and exact description of the same.

This process consists in decarbonizing the surface of steel, leaving such surface pure iron or nearly so, and thereby greatly facilitating its welding either to iron or upon itself, by subjecting the steel in a heated state to the action of iron scales or other suitable decarbonizing agent.

In performing my invention I take the article or articles of steel, the surfaces of which I wish to decarbonize, and pack it or them in suitable annealing-pots, surrounded by the iron scale or other decarbonizing agent; I then seal the pots with fire-clay as closely as possible to exclude the air, and submit the whole to a red heat in a suitable kiln or oven for from one to three hours. After this I allow the whole to cool, and the steel on its removal will be found to have a thin coating of pure or nearly pure iron, which will enable it to weld easily to iron or upon itself.

What I desire to claim is, not the manner of doing this, or of decarbonizing steel, but—

The facilitating the process of welding steel upon itself or upon iron by decarbonizing the surface of the steel to a very minute depth, leaving the balance or inner portion of the steel as it was originally or in its original state unchanged.

B. W. NICHOLS.

Witnesses:
ANNIE L. NICHOLS,
HENRY T. BROWN.